US012518585B2

(12) United States Patent
Yoshida et al.

(10) Patent No.: US 12,518,585 B2
(45) Date of Patent: Jan. 6, 2026

(54) BILL HANDLING SYSTEM

(71) Applicant: Japan Cash Machine Co., Ltd., Osaka (JP)

(72) Inventors: Shuichi Yoshida, Osaka (JP); Takeshi Ohama, Osaka (JP); Keiho Imanishi, Kyoto (JP); Ryouichi Imanaka, Kyoto (JP)

(73) Assignee: Japan Cash Machine, Co., Ltd. (JP)

( * ) Notice: Subject to any disclaimer, the term of this patent is extended or adjusted under 35 U.S.C. 154(b) by 763 days.

(21) Appl. No.: 17/417,083

(22) PCT Filed: Oct. 16, 2019

(86) PCT No.: PCT/JP2019/040675
§ 371 (c)(1),
(2) Date: Jun. 21, 2021

(87) PCT Pub. No.: WO2020/166135
PCT Pub. Date: Aug. 20, 2020

(65) Prior Publication Data
US 2022/0051506 A1   Feb. 17, 2022

(30) Foreign Application Priority Data

Feb. 13, 2019   (JP) ................... 2019-023102

(51) Int. Cl.
*G07D 11/26*   (2019.01)
*B25J 13/08*   (2006.01)
(Continued)

(52) U.S. Cl.
CPC .............. *G07D 11/26* (2019.01); *B25J 13/08* (2013.01); *B65H 7/04* (2013.01); *B65H 7/06* (2013.01);
(Continued)

(58) Field of Classification Search
CPC ........ G07D 11/26; G07D 7/181; G07D 11/12; G07D 11/16; G07D 11/40; G07D 2211/00;
(Continued)

(56) References Cited

U.S. PATENT DOCUMENTS 4,083,461 A * 4/1978 Wangermann ..... B65H 31/3045
53/529
5,148,591 A * 9/1992 Pryor ..................... G05B 19/39
29/407.04
(Continued)

FOREIGN PATENT DOCUMENTS

JP       6292095 A    4/1987
JP      201631619 A   3/2016
(Continued)

OTHER PUBLICATIONS

Translation of International Search Report for PCT/JP2019/040675 dated Jul. 1, 2020 (1 page).

*Primary Examiner* — Jeffrey A Shapiro
(74) *Attorney, Agent, or Firm* — FisherBroyles, LLP; Rob L. Phillips

(57) ABSTRACT

There is provided a bill handling system (1) including a camera (440), a grasping unit (430), and a control unit (100) for photographing the inside of the cashbox (10) by the camera (440) after a bill (B) in the cash box (10) is taken out by the grasping unit (430), determining whether or not a bill (B) remains in the cash box (10) based on the photographed image, and performing error processing when the bill (B) remains in the cash box (10).

20 Claims, 14 Drawing Sheets

(51) Int. Cl.
  *B65H 7/04* (2006.01)
  *B65H 7/06* (2006.01)
  *B65H 31/30* (2006.01)
  *B65H 43/02* (2006.01)
  *B65H 43/04* (2006.01)
  *G07D 7/181* (2016.01)
  *G07D 11/12* (2019.01)
  *G07D 11/16* (2019.01)
  *G07D 11/40* (2019.01)
  *B25J 9/16* (2006.01)
  *G06N 20/00* (2019.01)

(52) U.S. Cl.
  CPC ......... *B65H 31/3036* (2013.01); *B65H 43/02* (2013.01); *B65H 43/04* (2013.01); *G07D 7/181* (2017.05); *G07D 11/12* (2019.01); *G07D 11/16* (2019.01); *G07D 11/40* (2019.01); *B25J 9/1612* (2013.01); *B65H 2301/422542* (2013.01); *B65H 2405/50* (2013.01); *B65H 2553/42* (2013.01); *B65H 2701/1912* (2013.01); *G06N 20/00* (2019.01); *G07D 2211/00* (2013.01)

(58) Field of Classification Search
  CPC .. G07D 7/1205; G07D 7/2008; G07D 7/2016; G07D 7/182; G07D 7/183; G07D 11/20; G07D 11/22; G07D 11/225; G07D 11/23; G07D 11/235; G07D 11/237; B25J 13/08; B25J 9/1612; B25J 9/1682; B25J 19/023; B65H 7/04; B65H 7/06; B65H 31/3036; B65H 43/02; B65H 43/04; B65H 2301/422542; B65H 2405/50; B65H 2553/42; B65H 2701/1912; B65H 2511/51; B65H 2511/52; B65H 31/3045; B65H 2220/01; B65H 2220/03; B65H 2301/4314; B65H 2701/18267; B65H 2601/273; G06N 20/00; B66H 2701/1912; B65G 2203/041

See application file for complete search history.

(56) References Cited

U.S. PATENT DOCUMENTS

| | | | | |
|---|---|---|---|---|
| 7,325,667 | B1* | 2/2008 | Damick | B65G 59/02 |
| | | | | 198/395 |
| 9,514,593 | B2* | 12/2016 | Dopfer | B65H 1/02 |
| 9,881,439 | B2* | 1/2018 | Demmeler | B65H 31/3045 |
| 10,011,012 | B2* | 7/2018 | Krasny | B25J 9/1666 |
| 10,500,721 | B2* | 12/2019 | Takamizawa | B25J 9/163 |
| 10,593,142 | B2* | 3/2020 | Nakanishi | G07D 11/28 |
| 10,890,025 | B2* | 1/2021 | Uemizo | E05G 1/04 |
| 11,004,191 | B2* | 5/2021 | Adachi | G06N 3/08 |
| 11,302,134 | B2* | 4/2022 | Uemizo | G07D 11/16 |
| 11,339,606 | B2* | 5/2022 | Uemizo | G07D 11/165 |
| 11,427,361 | B2* | 8/2022 | Demmeler | B65H 31/3036 |
| 11,790,720 | B2* | 10/2023 | Uemizo | B65G 47/90 |
| | | | | 414/751.1 |
| 2006/0136095 | A1* | 6/2006 | Rob | G07F 11/62 |
| | | | | 700/245 |
| 2009/0026116 | A1* | 1/2009 | Lubbers | B07C 5/34 |
| | | | | 209/552 |
| 2012/0175217 | A1* | 7/2012 | Demmeler | B65H 1/30 |
| | | | | 194/206 |
| 2015/0179013 | A1* | 6/2015 | Dopfer | B65H 7/02 |
| | | | | 414/811 |
| 2017/0136632 | A1* | 5/2017 | Wagner | B07C 3/18 |
| 2019/0080543 | A1* | 3/2019 | Bogaki | G07D 7/128 |
| 2019/0358818 | A1* | 11/2019 | Kanitz | B60S 1/64 |
| 2021/0229275 | A1* | 7/2021 | Komaike | B25J 9/1697 |
| 2022/0032467 | A1* | 2/2022 | Odhner | G05B 19/4155 |

FOREIGN PATENT DOCUMENTS

| | | |
|---|---|---|
| JP | 2016224664 A | 12/2016 |
| JP | 2018149618 A | 9/2018 |
| WO | 2019026644 A1 | 2/2019 |

* cited by examiner

FIG. 4

| Error ID | Error date and time | BOX ID | Box type | Error information |
|---|---|---|---|---|
| ⋮ | ⋮ | ⋮ | ⋮ | ⋮ |

125

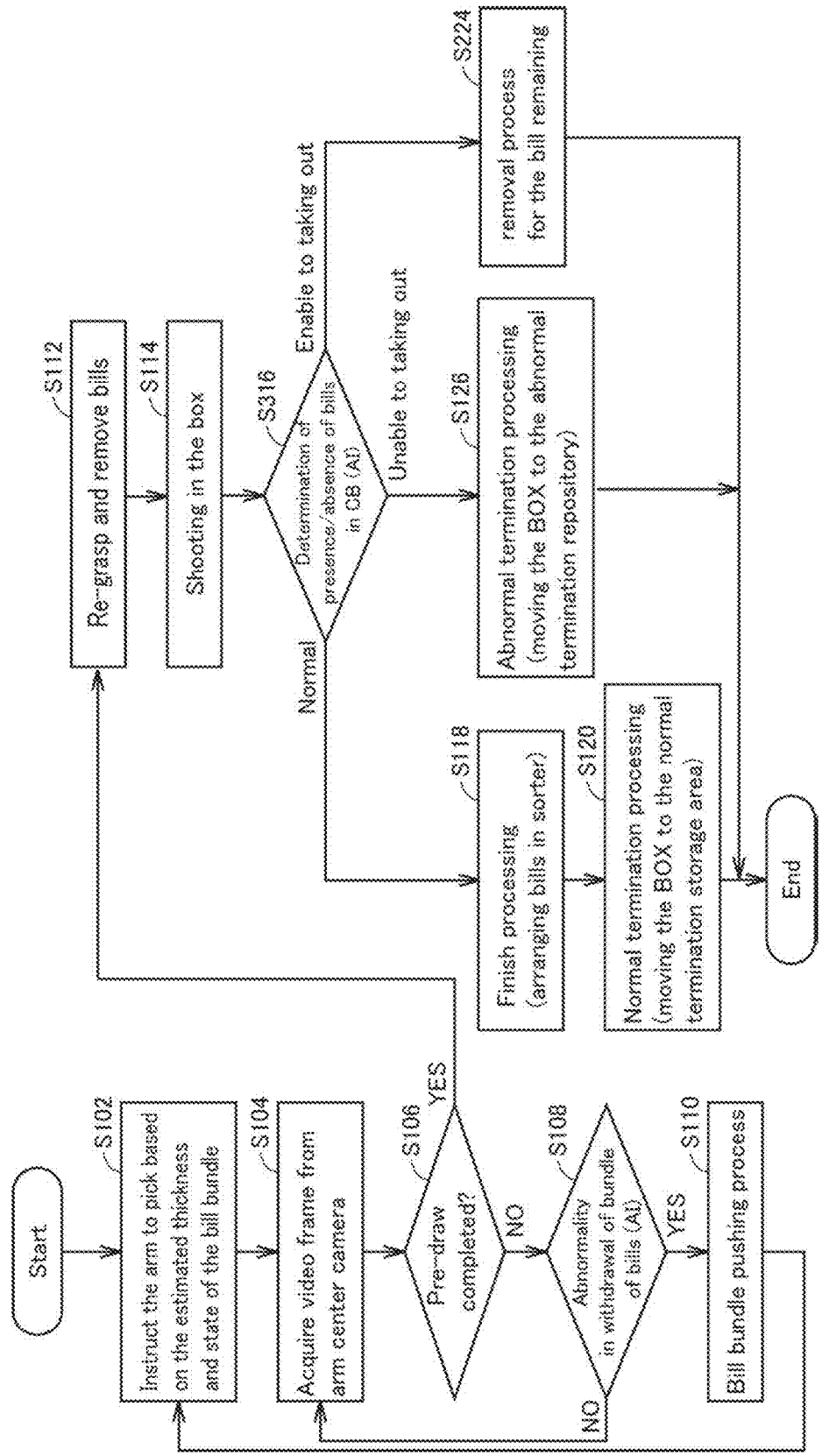

BILL HANDLING SYSTEM

TECHNICAL FIELD

The present invention relates to a technique for a bill handling system for automatically taking out bills in a cash box.

BACKGROUND ART

Conventionally, a bill handling system for conveying and arranging bills has been known. For example, Japanese Patent Laying-Open No. S62-92095 (Patent Literature 1) discloses a cash processing apparatus with joint type robot incorporated. According to Patent Literature 1, there is provided a cash processing apparatus with joint type robot incorporated, having a bill input and collection unit having a mechanism for collecting and transferring input bills to a robot hand, a bill count and bill confirmation unit having a mechanism for dividing bills received from the robot hand into the number and type of bills, a cash cassette unit having a mechanism for storing bills from the robot hand and a mechanism for extracting bills from the unit and transferring them to the robot hand, a bill counter unit for extracting bills from the robot, checking the number of bills and transferring to the robot, a bill dispensing unit for extracting bills from the robot and for transferring bills to the dispensing port, and a mechanism for transferring bills with a multi-articulated robot between the respective units.

Japanese Patent Laying-Open No. 2016-31619 (Patent Literature 2) discloses a storage work apparatus, a valuable medium storage system, and a storage work method. According to Patent Literature 2, the work robot images the appearance of the cassette by a camera provided on the head, to identify the type of cassette by image processing. The work robot opens the cassette by a jig and a procedure according to the type of cassette, captures the inside of the cassette, and detects the abnormality by image processing. In addition, the work robot captures an image of the bill sorting machine, identifies bills that can be taken out by image processing, takes out bills from the bill sorting machine, stores them in the cassette, and closes the cassette by a jig and a procedure according to the type of the cassette.

Japanese Patent Laying-Open No. 2016-224664 (Patent Literature 3) discloses a valuable medium processing system and a valuable medium processing method. According to Patent Literature 3, in the bill processing system, the work robot holds and moves the bundle of bills bound by the banding to the position where the banding can be removed by the bundle opening unit. The bundle opening unit cuts and removes the banding of the bundle of bills. The work robot stores the bundle of bills in the cassette. The bundle of bills bound by the banding can be used for replenishing the bills to the cassette, and the bills can be efficiently stored in the cassette.

CITATION LIST

Patent Literature

PTL 1: Japanese Patent Laying-Open No. S62-92095
PTL 2: Japanese Patent Laying-Open No. 2016-31619
PTL 3: Japanese Patent Laying-Open No. 2016-224664

SUMMARY OF INVENTION

Technical Problem

An object of the present invention is to provide a technique for reducing a problem that occurs when a bill remains in a cash box.

Solution to Problem

A bill handling system according to one aspect of the present invention includes a camera, a grasping unit and a control unit for photographing inside of a cash box by the camera after the bill is taken out by the grasping unit, determining whether or not the bill remains in the cash box based on a photographed image, and performing error processing when the bill remains in the cash box.

Advantageous Effects of Invention

As described above, according to the present invention, there is provided a technique for reducing a problem caused when a bill remains in a cash box.

BRIEF DESCRIPTION OF THE DRAWINGS

FIG. 4 is an image diagram showing an error data 125 according to First Embodiment.
FIG. 14 is a flowchart showing a processing procedure of the bill extraction control according to Fourth Embodiment.

DESCRIPTION OF EMBODIMENTS

Figure 1:
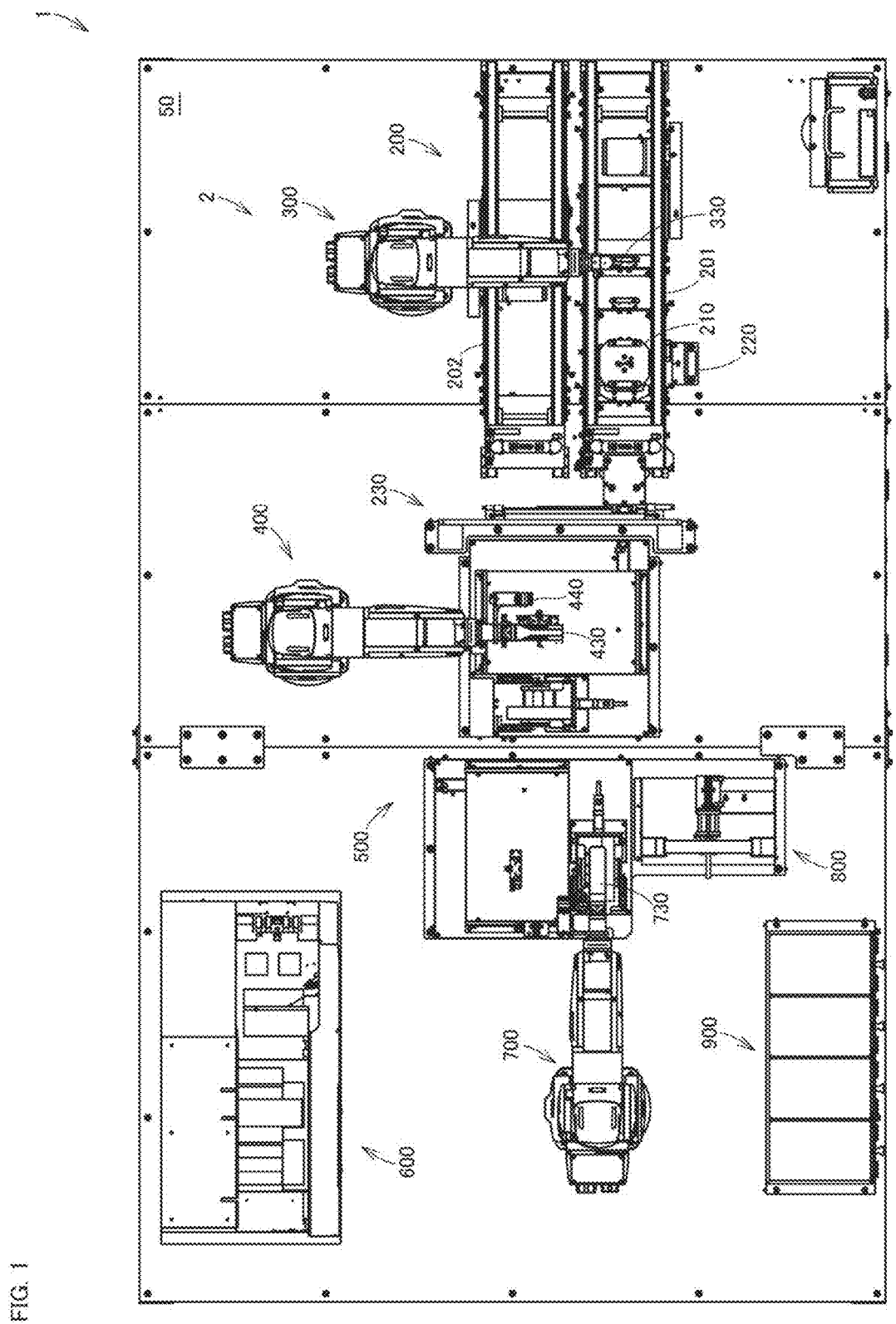
FIG. 1 is a plan view of a bill handling system 1 according to First Embodiment.

Embodiments of the present invention are described below with reference to the accompanying drawings. In the following descriptions, like elements are given like reference numerals. Such like elements will be referred to by the same names, and have the same functions. Accordingly, detailed descriptions of such elements will not be repeated.

First Embodiment

Overall Composition of Bill Handling System 1

Figure 2:
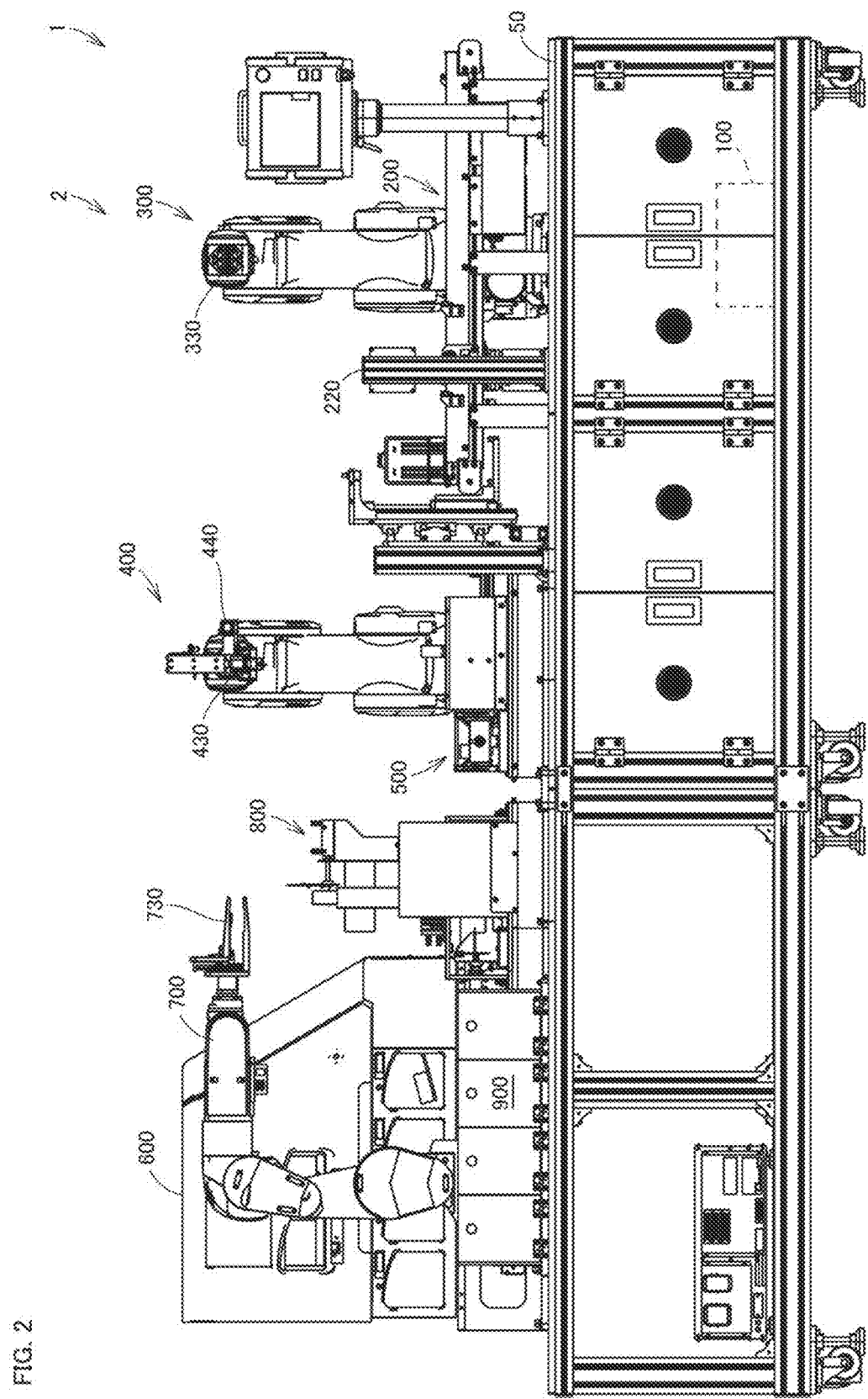
FIG. 2 is a front view of a bill handling system 1 according to First Embodiment.
Figure 3:
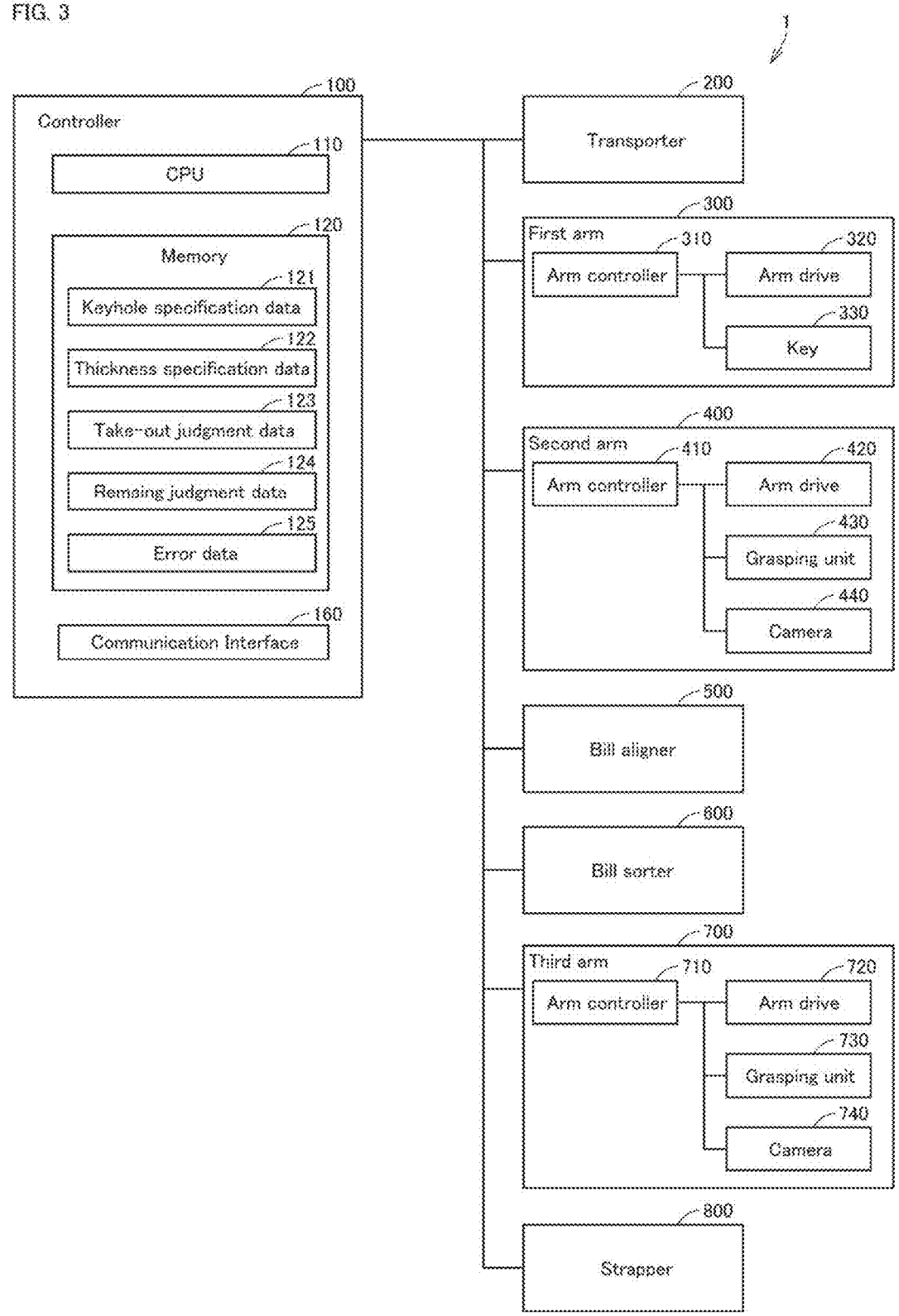
FIG. 3 is a functional block diagram of a bill handling system 1 according to First Embodiment.

As shown in FIGS. 1 to 3, the bill handling system 1 according to the present embodiment mainly includes a controller 100, a transporter 200, a first arm 300, a second arm 400, a bill aligner 500, a bill sorter 600, a third arm 700, a strapper 800, and a storage box 900. In the present embodiment, the transporter 200, a first arm 300, a second arm 400, a bill aligner 500, a bill sorter 600, a third arm 700, the strapper 800, and the storage box 900 is placed on top of the base 50. The controller 100 for controlling those devices is housed under the base 50.

The controller 100 mounts a memory 120 for storing various programs and data, a communication interface 160 for exchanging data with each part of the bill handling system 1, that is, a transporter 200, a first arm 300, a second arm 400, a bill aligner 500, a third arm 700, a strapper 800, and the like, a CPU110 for controlling the controller 100 according to various programs stored in the memory 120 and for controlling each part of the bill handling system 1 via the communication interface 160.

In particular, in the present embodiment, the controller 100 stores keyhole specification data 121, thickness and state specification data 122, take-out judjment data 123, remaining judjment data 124, error data 125, and the like in its memory 120.

More specifically, the keyhole specification data 121 stores the image data and feature data of the keyhole for each type of cash box. CPU110 of the controller 100 identifies the position of the key hole of the cash box based on the captured images from the second arm 400 by referring to the keyhole specification data 121.

The thickness and state specification data 122 stores image data and characteristic data for determining the thickness of a bundle of bills stored in the cash box 10. In particular, in the present embodiment, the thickness and state specification data 122 also stores image data and characteristic data for judging the degree of wrinkling or damage of the bill. It is preferable that the image data and the characteristic data are prepared for each type of the cash box 10 and the bill. CPU110 of the controller 100 identifies the thickness of the bill in the cash box 10 based on the captured images from the second arm 400 by referring to the thickness and status specification data 122.

The take-out judjment data 123 stores image data and characteristic data of bills, which is being taked out, stored in the cash box 10. It is preferable that the image data and the characteristic data are prepared for each type of the cash box 10 and the bill. CPU110 of the controller 100 refers to the take-out judjment data 123 to determine whether or not the bill stored in the cash box 10 is normally pulled out to a predetermined position by the second arm 400 based on the captured images from the second arm 400.

The remaining judjment data 124 stores image data and characteristic data for detecting that a bill remains in the cash box 10 after the bills is taken out by the second arm 400. In the present embodiment, the remaining judjment data 124 stores an image and characteristic data for determining whether or not the bill can be automatically taken out by the second arm or another device. It is preferable that the image data and the characteristic data are prepared for each type of the cash box 10 and the bill. CPU110 of the controller 100 refers to the remaining judjment data 124 to determine whether or not the bill remaining in the cashbox 10 can be automatically taken out based on the captured images from the second arm 400.

The error data 125 stores various kinds of information of the case when an error occurs. For example, as shown in FIG. 4, the error data 125 stores, each time an error occurs, the identification information of the error, the date and time when the error was detected, the identification information of the cash box 10 read from RFID of the cash box 10, the type of the cache box 10 read from RFID of the cache box 10, and information on an error such as an image of the inside of the cache box 10 or an error type for identifying the remaining state of the bill. In the present embodiment, when CPU110 of the controller 100 determines that the bill remains in the cash box 10 after the bill is taken out from the cash box 10 by the second arm, CPU110 executes the error process described below and accumulates the error data related the error in the error data 125. This makes it possible to specify the cause of the bills remaining in the cash box 10 and the type of the cash box 10 in which the bills tend to remain.

Overview of the Overall Operation of the Bill Handling System 1

The overall operation of the bill handling system 1 according to the present embodiment are described below with reference to FIG. 5.

Transporter 200, based on a command from the controller 100, carries the cash box 10 (see FIG. 6) (step S002). The transporter 200 conveys the cashbox 10, which has been brought into from the outside of the room in which the bill handling system 1 is disposed, to the vicinity of the first arm 300. In this embodiment, the transporter 200 has a first conveyor 201 and the second conveyor 202 and the reverser 210 and RFID antenna 220 and the transfer unit 230.

The controller 100 identifies the face having the keyhole 12 of the cash box 10, i.e., the face of the lid door 11 side, based on the data from RFID antenna 220 (step S004). In the present embodiment, RFID tags are attached to the face, that does not have the keyholes 12, of the cashbox 10. Controller 100, based on a signal from RFID antenna 220, when the antenna 220 detects RFID tag, determines that there is a lid 11 and keyhole 12 on the opposite surface, and passes the cash box 10 in the same posture to the transfer unit 230. At this time, CPU110 of the controller 100 may specify the identification information, the type, and the like of the cash box 10 based on the signals from RFID antennas 220.

In this embodiment, the transfer unit 230 passes the cash box 10 from the first conveyor 201 to the second conveyor 202.

On the other hand, the controller 100, based on a signal from RFID antenna 220, when the antenna 220 does not detect RFID, determines that there is a lid 11 and keyhole 12 on the surface of the antenna 220 side, and rotates the cash box 10 using the reverser 210 in order that the surface faces the first arm 300 side (step S006). Then, the controller 100 transfers the rotated cash box 10 to the second conveyer 202. Also in this case, CPU110 of the controller 100 may specify the identification information, the type, and the like of the cash box 10 based on the signals from RFID antennas 220.

Figure 7:
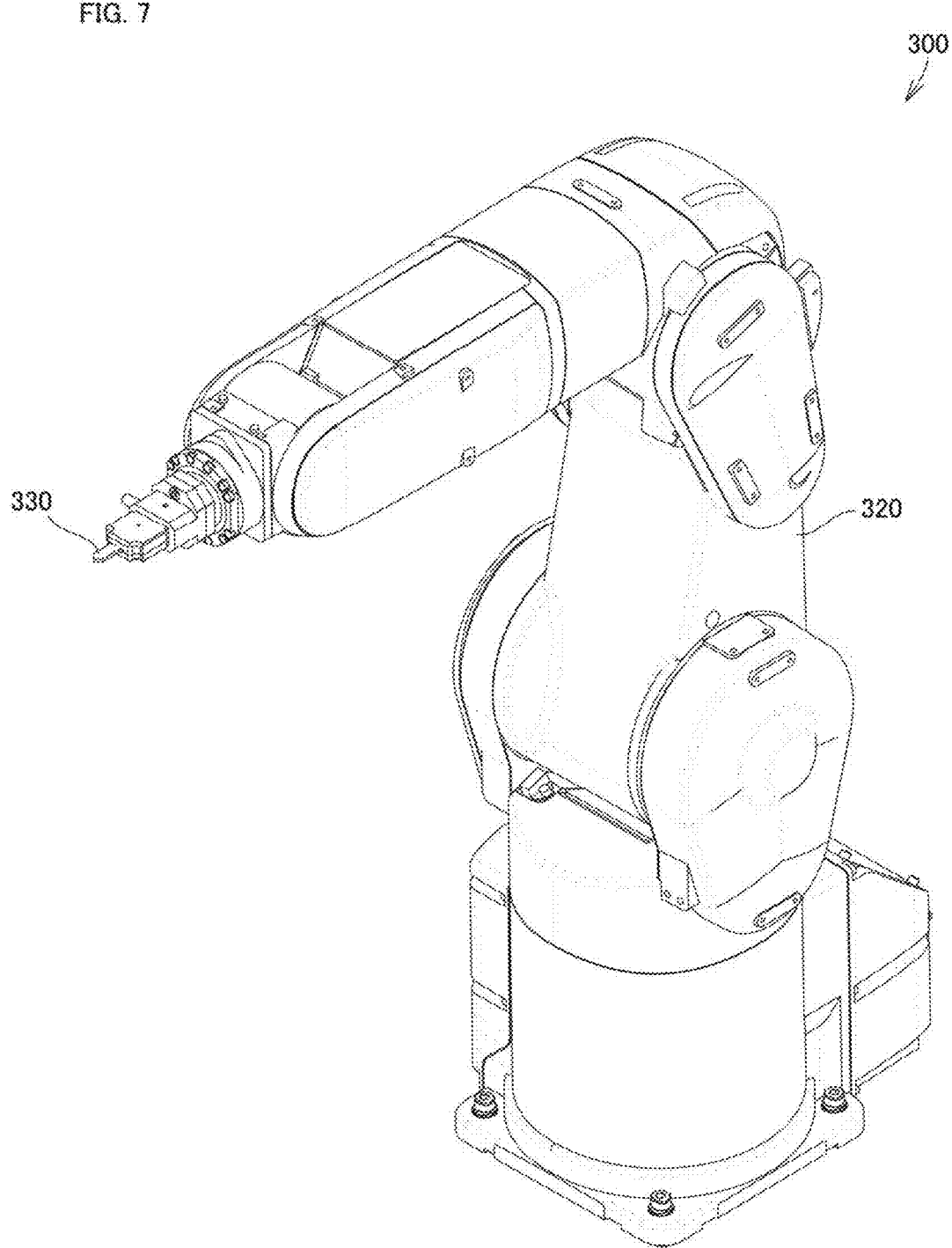
FIG. 7 is a perspective view of a first arm 300 according to First Embodiment.

Here, as shown in FIG. 7, the first arm 300 according to the present embodiment has a key 330 for unlocking the lid 11 of the cash box 10. The first arm 300, based on a command from the controller 100, by driving the motor and actuator inside the arm drive unit 320, moves the position of the key 330 in the front, rear, left, right, up and down and rotates the key 330 to insert the key into the keyhole 12 of the cash box 10. The first arm 300, based on a command from the controller 100, unlocks the cash box 10 by rotating the key 330, and opens the lid 11 as it is.

Figure 8:
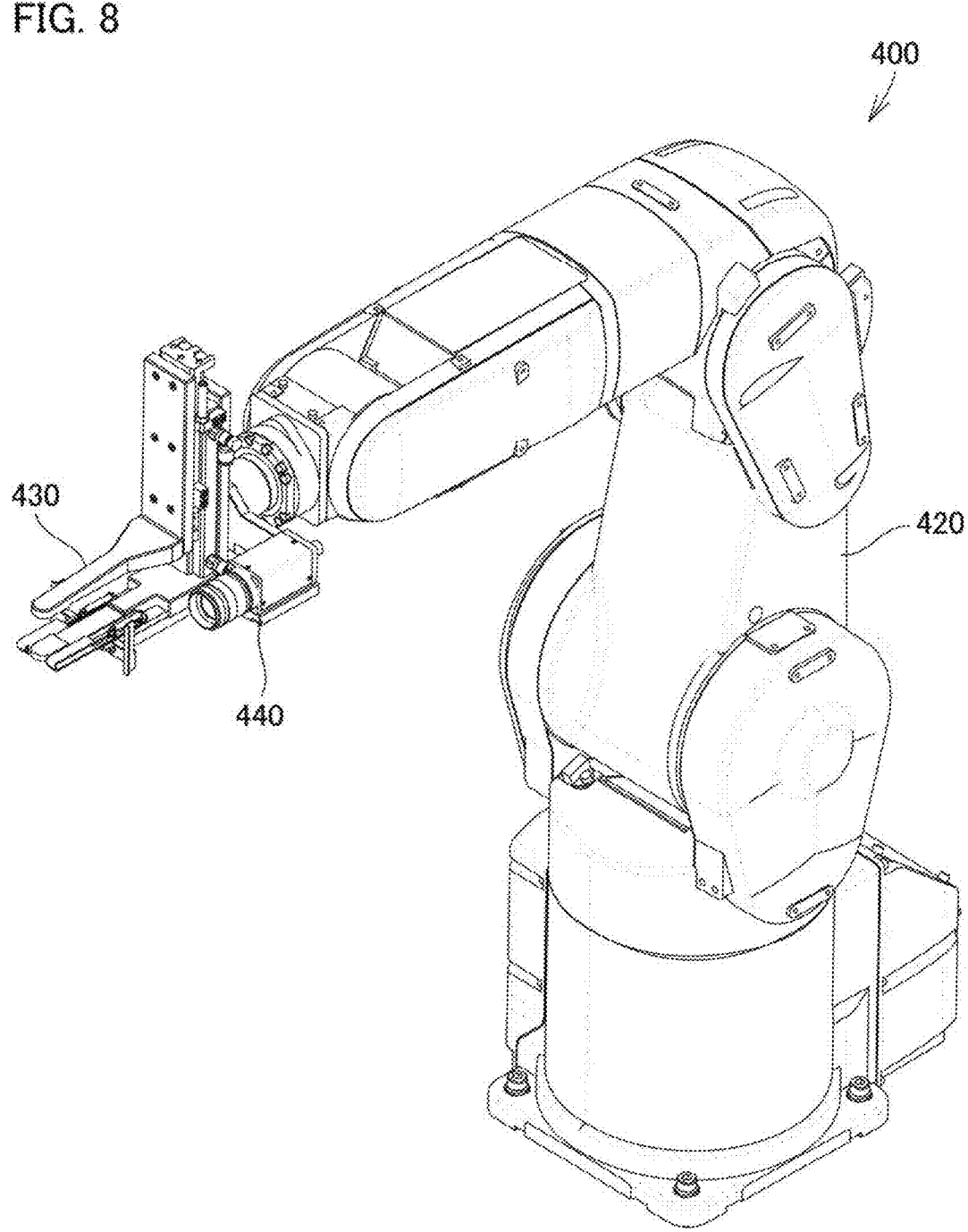
FIG. 8 is a perspective view of a second arm 400 according to First Embodiment.

Further, as shown in FIG. 8, the second arm 400 according to the present embodiment has a grasping unit 430, and a camera 440. The second arm 400, based on a command from the control unit 100, by driving the motor and actuator inside the arm driving unit 420, moves and rotates the camera 440 in the front, rear, left, right, up, and down, photographs the lid 11 of the cash box 10, and photographs the inside of the cash box 10. Further, the second arm 400, based on a command from the control unit 100, by driving the motor and actuator inside the arm driving unit 420, moves and rotates the grasping unit 430 in the front, rear, left, right, up, and down, grabs the bills in the cash box 10, take out the bills, and places the bills on the bill sorting apparatus 500. In particular, in the present embodiment, the controller 100 executes a process for detecting a remaining bill and a process for taking out the bill, as described below.

Returning to FIG. 5, the controller 100 moves the cash box 10 to the front of the front of the first arm 300 using the transporter 200. The controller 100, as shown in FIG. 6, captures a front view of the cash box 10 with the camera 440 of the second arm 400 (step S008). The controller 100 identifies the position of the key hole 12 based on the image data by referring to the keyhole specification data 121 for each type of the cash box 10 (step S010). The controller 100 controls the first arm 300 to move and insert the key 330 into the keyhole 12. The controller 100 controls the first arm 300 to rotate the key 330 (step S012). The controller 100 controls the first arm 300 to open the lid of the cashbox 10 (step S014).

As will be described in detail later, the controller 100 controls the second arm 400 to draw out the bills in the cash box 10 by referring to the thickness and status specification data 122 (step S016). The controller 100 controls the second arm 400 to rotate the grasping unit 430 by 90 degrees to make the bill vertical. The controller 100 controls the second arm 400 to place the bill on the bill aligner 500.

The bill aligner 500 arranges bills based on a command from the controller 100. That is, the bill aligner 500 aligns the position of the edge of the bundle of bills (step S018). More specifically, in the present embodiment, when the vertically erected bills is placed by the second arm 400, the bill aligner 500 supports the bill from the side by a plate so that the bill does not fall. Then, the bill aligner 500 applies vibration to the bills by a vibrator (not shown) to align the positions of the bottom surface and the side surface of the vertically erected bills. In the present embodiment, the bill aligner 500 can also align the top surface of the bills by pressing the bills from above with the plate while vibrating the bills.

The controller 100 controls the second arm 400, which has waited during the aligning of the bill, to grasp the aligned bill again. The controller 100 controls the second arm 400 to place the aligned bills on the insertion slot of the bill sorter 600. In the present embodiment, the controller 100 controls the second arm 400 to push the bill placed in the insertion slot into the back by the tip of the grasping unit 430. The bill sorter 600 determines each type of the bills received from the second arm 400, and stores the bill separately for each banknote type of bill (step S020).

In the present embodiment, the bill sorter 600 may reject the bill that has failed to be sorted. When the bill sorter 600 rejects the bill (YES in step S022), the controller 100 controls the third arm 700 to grasp the rejected bill by the grasping unit 730. The controller 100 controls the second arm 400 to receive the rejected bill from the third arm 700 by the grip 430. Then, the controller 100 places the bill on the insertion slot of the bill sorter 600 again (step S020).

In the present embodiment, the bill sorter 600 displays the number of sheets sorted and stored for each banknote type when sorting the bills. The bill sorter 600 stops sorting when a predetermined number of sheets, for example, 100 sheets, are accumulated for each banknote type. In the present embodiment, a camera is also mounted on the third arm 700, and the controller 100 acquires the number of sorted bills for each banknote type of bill from an image photographed by the camera. The controller 100 controls the third arm 700 to grasp the bill by the grasping unit 730 when the number of the sorted bills of any of the banknote types reaches a predetermined number, and delivers the bill to the strapper 800. It is preferable to align the bills again by the bill aligner 500 before the bills are delivered to the strapper 800.

The strapper 800 wraps the strap around the bundle of the predetermined number of bills (step S024). The controller 100 controls the third arm 700 to grasp the bill wound with the band and throw it into the storage box 900. In the present embodiment, the storage boxes 900 are separated for each type of banknote. The controller 100 controls the third arm 700 to throw the bill wound with the band into the storage boxes 900 according to the type of banknote (step S026).

As described above, in the bill handling system 1 according to the present embodiment, since the bills can be automatically taken out from the locked cash box 10 and the bills can be sealed for each banknote type, the bills can be handled safer and more conveniently than in the past.

Configuration of the Bill Taking-Out System 2

Hereinafter, the function of the bill taking-out system 2 for taking out bills from the cash box 10 will be described. The bill taking-out system 2 according to the present embodiment mainly includes a first arm 300, a second arm 400, a controller 100, and the like.

Figure 5:
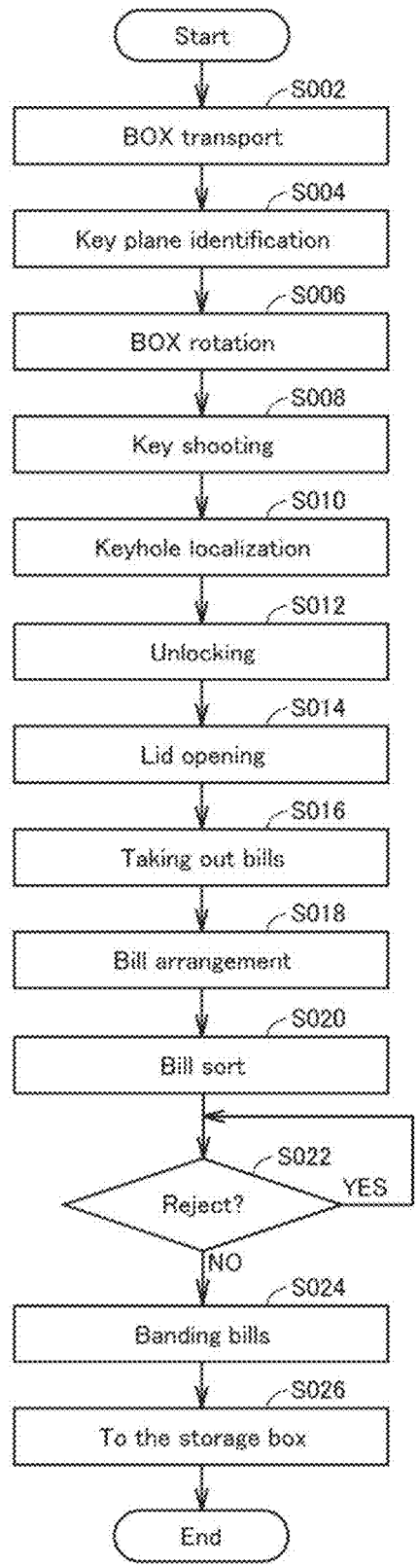
FIG. 5 is a flowchart showing a processing procedure of the entire bill handling control according to First Embodiment.
Figure 6:
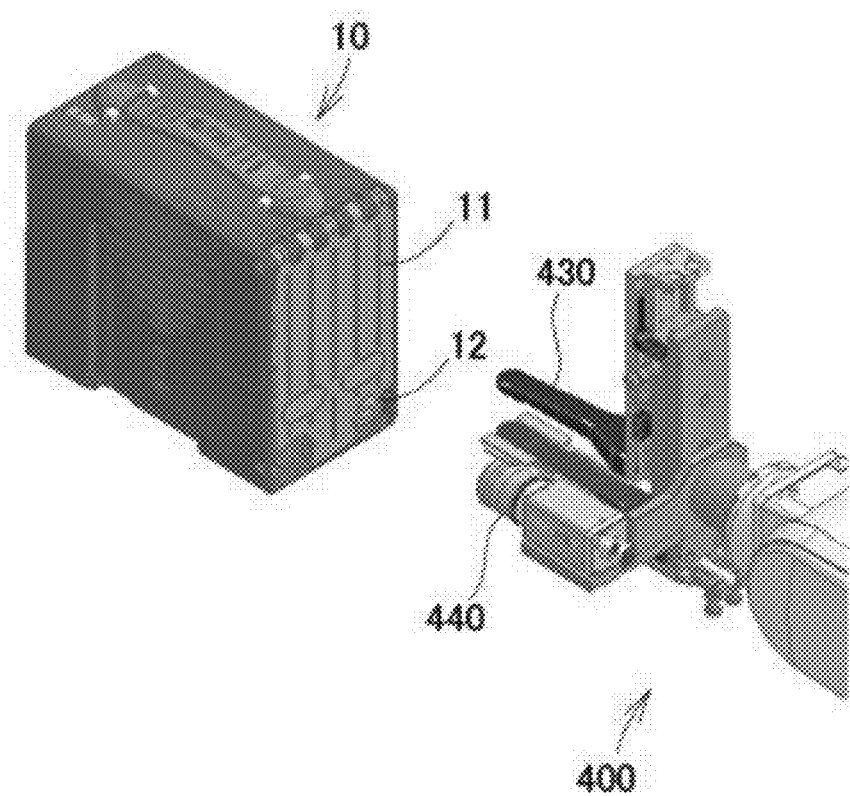
FIG. 6 is a perspective view of a cash box 10 according to First Embodiment.
Figure 9:
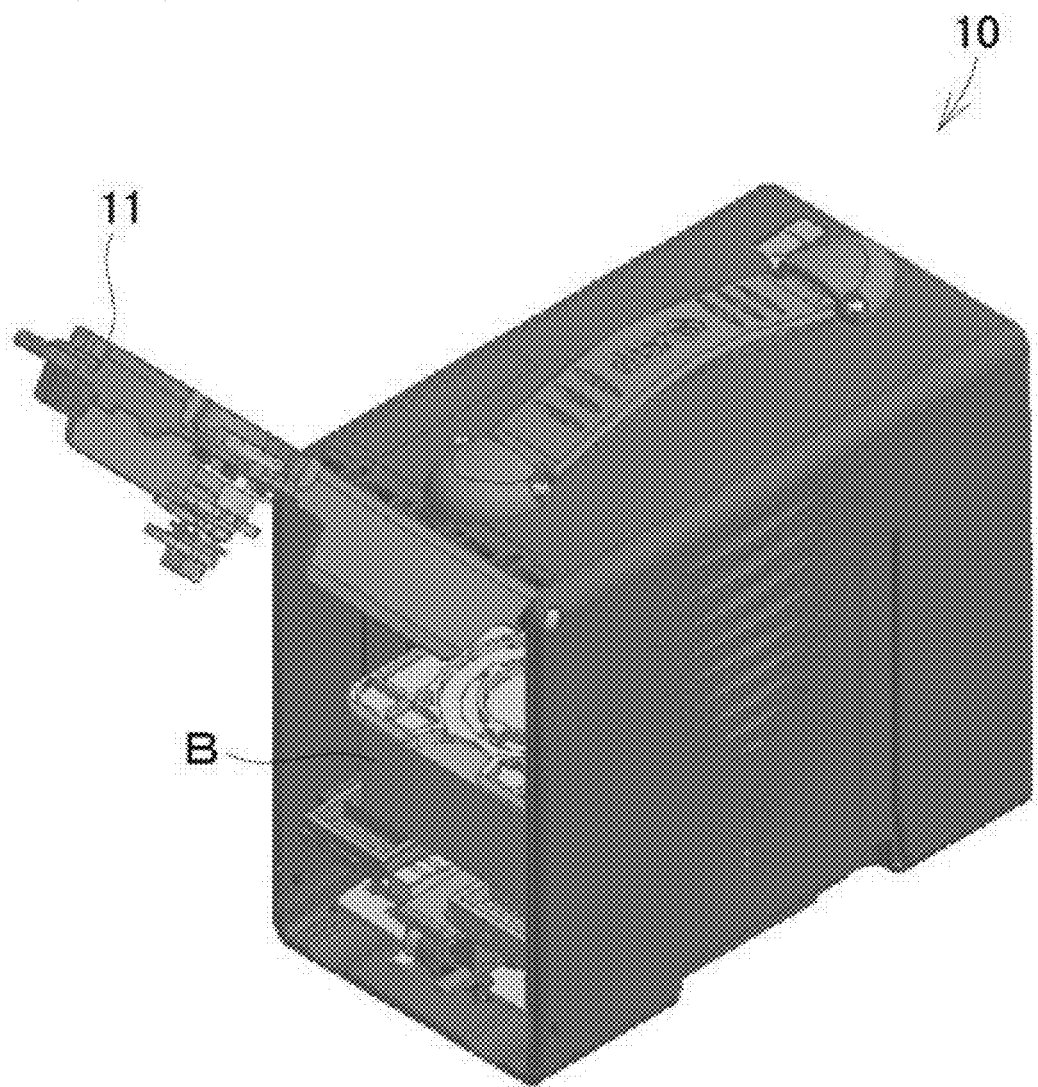
FIG. 9 is a perspective view of a cash box 10, when a lid 11 is opened, according to First Embodiment.

In the present embodiment, in the step S014 and step S016 of FIG. 5, when the cash box 10 is transported to the front of the first arm 300 or the second arm 400 by the transport conveyor 202 of the discharge side, controller 100 identifies the position of the keyhole 12 by photographing the surface of the cash box 10 by the camera 440 of the second arm 400, as shown in FIG. 9, unlocks the key 12 of the lid 11 of the cash box 10 by the first arm 300 to open the lid 11.

Figure 10:
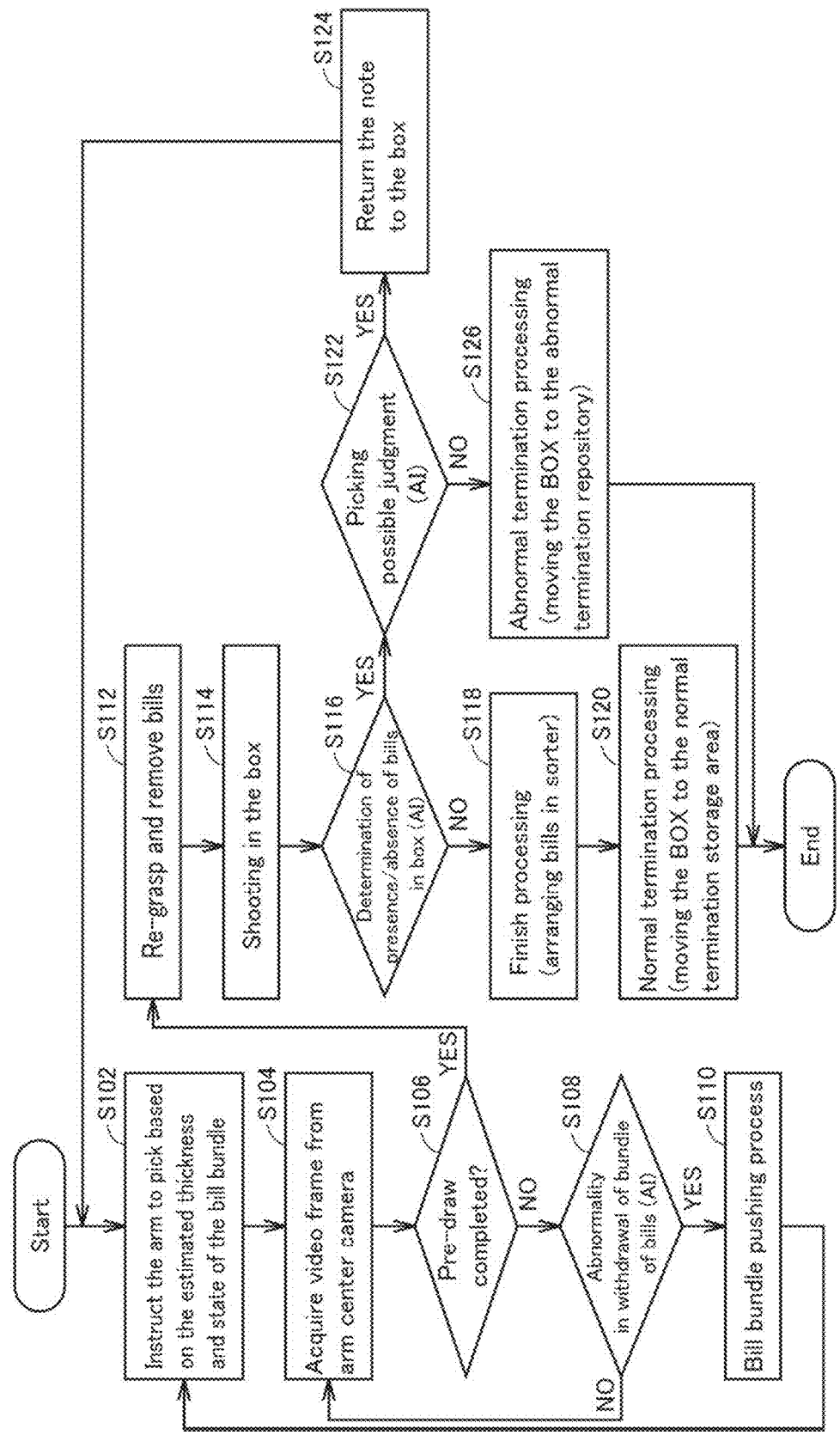
FIG. 10 is a flowchart showing a processing procedure of the bill extraction control according to First Embodiment.

Referring to FIG. 10, a subsequent control of the first arm 300 and second arm 400 by the controller 100 will be described below in detail.

First, CPU110 of the controller 100 controls the second arm 400 via the communication interface 160 to instruct the camera 440 to move to the front of the cash box 10. CPU110 instructs the second arm 400 to photograph the inside of the cash box 10 via the communication interface 160. CPU110 identifies the thickness of the bundle of bills B based on the image data from the camera 440 by referring to the thickness and status specification data 122 of the memory 120, and instructs the second arm 400 to extract the bills B in the cash box 10 via the communication interface 160 (step S102).

CPU110 may specify not only the thickness of the bundle of the bills B but also the degree of wrinkling or damage of the bills B, based on the image data obtained from the camera 440, by referring to the thickness and status specification data 122, and may determine the drawing velocity of the bills B corresponding to the degree of wrinkling or damage of the bills B. For example, in the case where the degree of wrinkling or damage of the bill B is large, it is possible to reduce damage to the bill B or to reduce the possibility that the bill B slips down, by reducing the draw-out speed. CPU110 instructs the second arm 400 to pull out the bill B in the cash box 10 and instructs draw-out speed via the communication interface 160.

Figure 11:
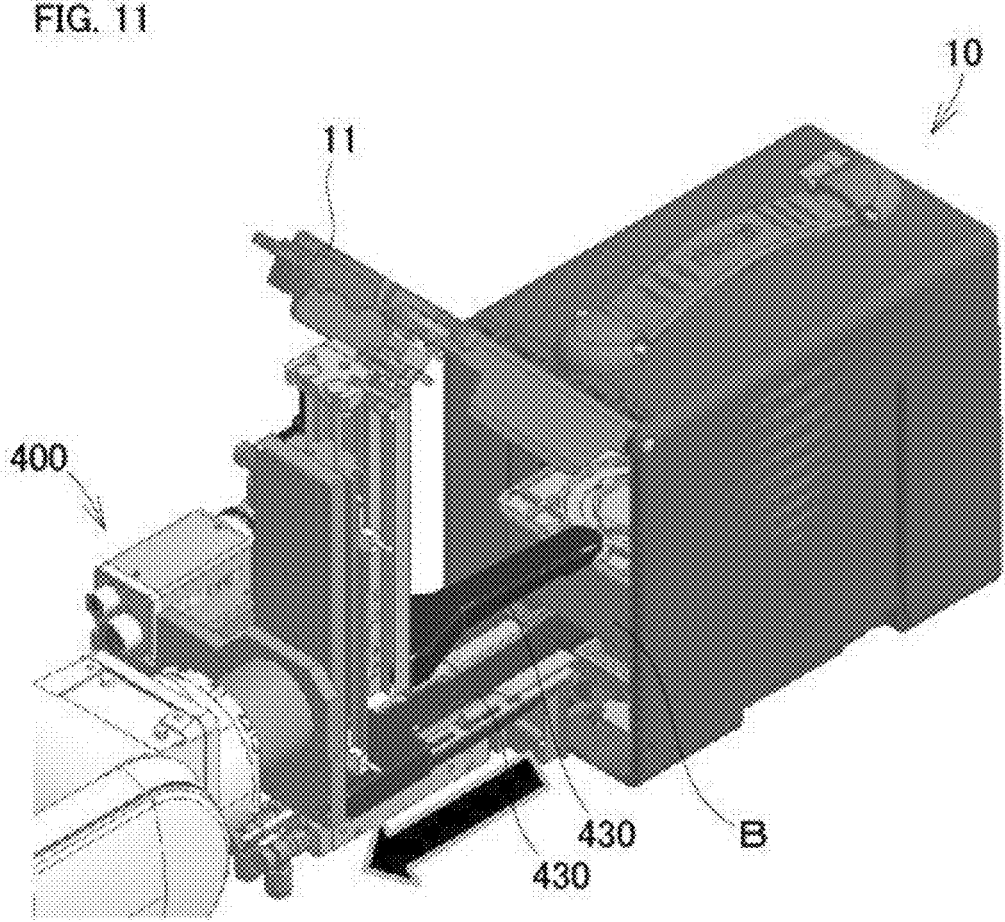
FIG. 11 is a perspective view of a cache box 10 and the second arm 400, when the edge of the bill is grasped, according to First Embodiment.
Figure 12:
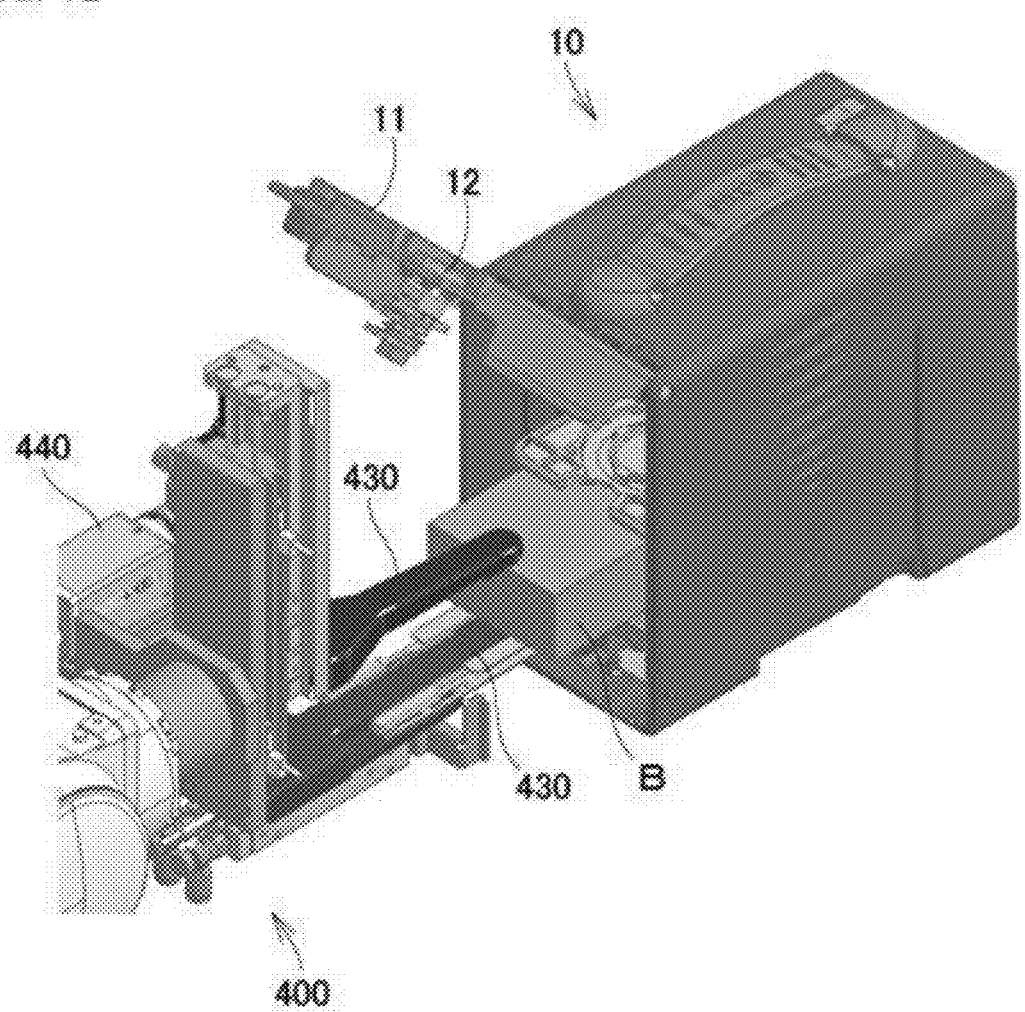
FIG. 12 is a perspective view of a cashbox 10 and a second arm 400, when the bill has been pulled out, according to First Embodiment.

As a result, as shown in FIG. 11, the second arm 400 grasps the end of the bundle of bills B from the cash box 10 and starts to extract the bundle of bills B to the front. That is, preliminary drawing of the bill B is executed. As shown in FIG. 12, the preliminary extraction of the bill B refers to an operation of grasping the bill B and drawing the bill B forward by several cm. This in turn allows the grasping unit 430 of the second arm 400 to re-grip the central portion of the bill B.

CPU110 again instructs the second arm 400 to photograph the inside of the cash box 10 via the communication interface 160 (step S104). CPU110 refers to the take-out judjment data 123 stored in the memory 120, and determines whether or not preliminary extraction of the bill B from the cash box 10 has been completed based on the image data from the camera 440 (step S106).

For the process of determining whether or not there is an abnormality in the extraction of the bundle of bills, such as the process of determining whether or not the preliminary extraction of the bundle of bills has been performed smoothly, or the process of determining whether or not the extraction of the bundle of bills has been performed smoothly in the middle of the extraction of the bundle of bills, the determination method by machine learning typified by deep learning may be used in advance. For example, in advance, a classifiable machine learning model is trained with respect to an image group in which a bundle of bills is normally drawn out and an image group in which a bundle of bills is drawn out in various abnormal states. Then, CPU110 can realize step S108 by making these determinations using the trained machine-learning models based on the image data from the center camera 440 of the second arm 400.

When the preliminary extraction of the bill B from the cash box 10 has not been completed (NO in step S106), CPU110 determines whether or not an error has occurred in the preliminary extraction process of the bill B based on the image data from the camera 440 or the measurement results from other sensors (step S108).

If no error has occurred in the preliminary extraction processing of the bill B (NO in step S108), CPU110 repeats the processing from step S104. When CPU110 determines that an error has occurred in the preliminary extraction processing of the bill B (YES in step S108), CPU110 instructs the second arm 400 to perform the pushing-in processing of the bill B (step S110).

As a result, the second arm 400 moves the bill B to the back of the cash box 10 while holding the bill B by the grip 430, and then pushes the bill B into the back of the cash box 10 by the tip of the grip 430. Then, CPU110 of the controller 100 repeats the process from step S102.

When the preliminary extraction of the bill B from the cash box 10 is completed (YES in step S106), CPU110 commands the second arm 400 to re-grasp the central part of the bill B and completely remove the bill B from the cash box 10, via the communication interface 160 (step S112).

In the present embodiment, CPU110 is programmed to pull out the bundle of bills to the end when CPU110 determines that the preliminary extracting of the bundle of bills is normally completed. CPU110 may, plural times, judge whether or not the drawing of the bundle of bills is normally executed, or always repeat the judgment as to whether or not the drawing of the bundle of bills is normally executed, by repeating the photographing by the camera 440, until the bundle of bills is completely taken out from the cash box 10.

Upon receiving a signal from the second arm 400 indicating that the removal of the bill B has been completed, CPU110 instructs the second arm 400 to take an image of the inside of the cash box 10 via the communication interface 160 (step S114).

CPU110 determines whether or not the bill B remains in the cash box 10 based on the image data from the camera 440 (step S116). In the present embodiment, CPU110 refers to the remaining judjment data 124 stored in the memory 120 and determines whether or not the bill B remains in the cash box 10 based on a large number of image data and feature data of the case in which the bill B remains in the cash box 10. It is preferable that CPU110 determines whether or not the bill B remains in the cash box 10 by using the remaining judjment data 124 for each type based on the type of the cash box 10 acquired from RFID tags.

If no bill B remains in the cash box 10 (NO in step S116), CPU110 ends the process of taking out the bill B from the cash box 10 this time. More specifically, CPU110 instructs, via the communication interface 160, the second arm 400 to place the grasped bill B on the bill aligner 500, or instructs the first arm 300 to close and lock the cover 11 of the cash box 10 (step S118). Then, CPU110 instructs, via the communication interface 160, the transporter 200 to carry out the empty cash box 10 after locking (step S120). CPU110 proceeds to the bill taking-out process for the following cash box 10.

On the other hand, when the bill B remains in the cash box 10 (YES in step S116), CPU110 refers to the remaining judgment data 124 stored in the memory 120, and determines whether or not the bill B remaining in the cash box 10 can be automatically taken out based on the image data from the camera 440 (step S122). In the present embodiment, CPU110 refers to the remaining judgment data 124 stored in the memory 120, and determines whether or not the second arm 400 can extract the bill B remaining in the cash box 10, based on a large number of image data and characteristic data of the case in which the second arm 400 can extract the bill B. It is preferable that CPU110 judges whether or not the bill B remaining in the cash box 10 can be automatically taken out by using the remaining judgment data 124 for each type based on the types of the cash boxes 10 acquired from RFID tags.

When the bill B remaining in the cash box 10 can be taken out by the second arm 400 (YES in step S122), CPU110 instructs the second arm 400 via the communication interface 160 to return the currently grasped bill B into the cash box 10 (step S124), and repeats the process from step S102. CPU110 may repeat the process of placing the grasped bill B on the sorter and then again determining the thickness and condition of the remaining bill B to grasp the bill B. In the other word, CPU110 may repeat the process from step S102.

When the second arm 400 cannot take out the bill B remaining in the cash box 10 (NO in step S122), CPU110 executes an abnormal termination process (step S126). For example, CPU110 instructs the second arm 400 to place the currently grasped bill B on the bill aligner 500 via the communication interface 160, then instructs the first arm 300 to close and lock the cover 11 of the cashbox 10, or causes the transporter 200 to convey the cash box 10 in which the bill B remains to a predetermined area. In addition, CPU110 may perform error notification. CPU110 proceeds to the bill take-out process for the following cash box 10.

Second Embodiment

In the step S126, CPU110 may simply stop the bill taking-out process and transmit an error notification to the terminal of the administrator via the communication interface 160. In this case, the terminal outputs a voice message indicating an error from the speaker or displays information indicating an error on the display. Alternatively, the controller 100 may emit a warning sound of an error from a speaker or display information indicating the error on a display.

Third Embodiment

Figure 13:
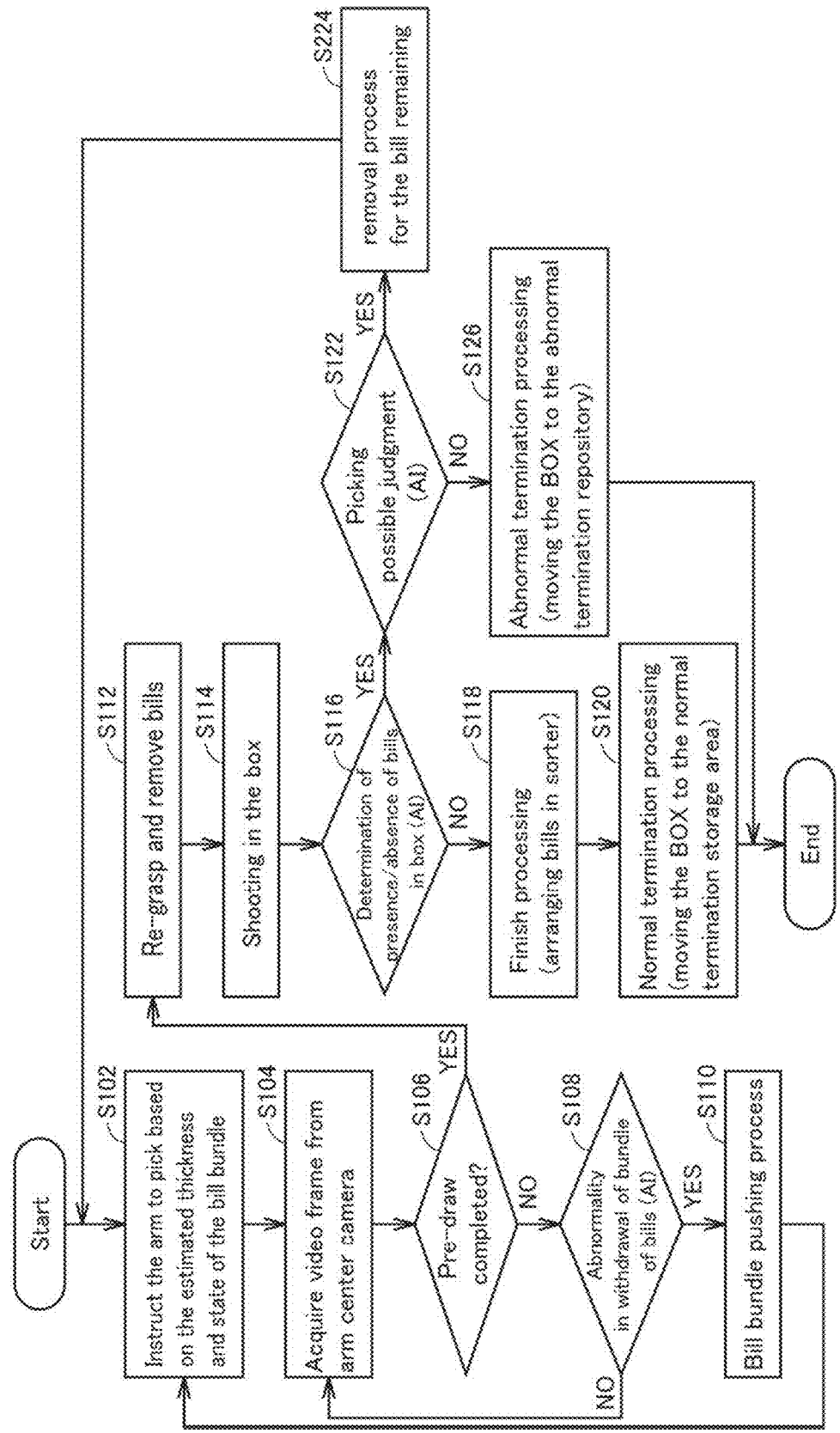
FIG. 13 is a flowchart showing a processing procedure of the bill extraction control according to Third Embodiment.

Alternatively, as shown in FIG. 13, instead of the step S124, CPU110 may instructs the second arm 400 to place the currently grasped bill on the bill aligner 500 via the communication interface 160, and then instructs the second arm 400 to grasp and remove the bill remaining in the cash box 10, or instructs another apparatus to remove the bill remaining in the cash box 10 (step S224). In addition, CPU110 may perform error notification. Note that the bills remaining in the cash box 10 may be placed on the bill aligner 500, or may be put into a specific container or the like. Then, CPU110 proceeds to the bill take-out process for the following cash box 10.

Forth Embodiment

In addition, the present invention is not limited to the form in which processing of two stages of step S116 and step S122 is performed, and as shown in FIG. 14, CPU110 may determine whether a state in which no bill remains in the cash box 10, a state in which the bill remaining in the cash box 10 can be automatically taken out, or a state in which the bill remaining in the cash box 10 cannot be automatically taken out, based on a large number of image data of each state included in the remaining judgment data 124 stored in the memory 120, based on image data from the camera 440 taken in step S114 (step S316). CPU110 may determine, based on the type of the cash box 10 acquired from RFID tag, by using the remaining judgment data 124 for each type of the cash box 10, whether a state in which there is no bill left in the cash box 10, a state in which the bill remaining in the cash box 10 can be automatically taken out, or a state in which the bill remaining in the cash box 10 cannot be automatically taken out.

For the process of judging whether or not the bill can be automatically taken out, a judgment method may include machine learning typified by deep learning in advance. For example, a classifiable machine learning model is trained in advance with respect to an image group in which a bill normally remains in a cash box and an image group in which a bill remains in various abnormal states. Then, CPU110 can realize the step S122 by performing the determination using the trained machine-learning models based on the image data from the camera 440.

In addition, for the process of determining whether or not a bill remains, a determination method may include machine learning typified by deep learning. For example, a classifiable machine learning model is trained in advance with respect to an image group in which no bill remains in the cash box and an image group in which the bill remains in various states. Then, CPU110 can realize step S116 and S316 by performing the determination using the trained machine-learning models based on the image data from the camera 440.

When CPU110 determines that no bill remains in the cash box 10, CPU110 ends the bill taking-out process for the present cash box 10. More specifically, CPU110 instructs, via the communication interface 160, the second arm 400 to place the grasped bill on the bill aligner 500, or instructs the first arm 300 to close and lock the cover 11 of the cash box 10 (step S118). Then, CPU110 instructs, via the communication interface 160, the transporter 200 to carry out the empty cash box 10 after locking (step S120). CPU110 proceeds to the bill taking-out process for the following cash box 10.

When CPU110 determines that the bill remaining in the cash box 10 can be taken out, CPU110 instructs the second arm 400 to place the currently gripped bill on the bill aligner 500 and then causes the second arm 400 to grasp and take out the bill remaining in the cash box 10, or causes another apparatus to take out the bill remaining in the cash box 10, via the communication interface 160 (step S224). In addition, CPU110 may perform error notification. Note that the bills remaining in the cash box 10 may be placed on the bill aligner 500, or may be put into a specific container or the like. Then, CPU110 proceeds to the bill taking-out process for the following cash box 10.

When the second arm 400 cannot take out the bills remaining in the cash box 10, CPU110 executes an abnormal termination process (step S126). For example, CPU110 instructs the second arm 400 to place the currently grasped bill on the bill aligner 500, then instructs the first arm 300 to close and lock the cover 11 of the cash box 10, and causes the transporter 200 to convey the locked cash box 10 in which the bill remains to a predetermined area, via the communication interface 160. In addition, CPU110 may perform error notification.

Naturally, CPU110 may simply stop the bill taking-out process and send an error notification to the administrator's terminal via the communication interface 160. In this case, the terminal outputs a voice message indicating an error from the speaker or displays information indicating an error on the display. Alternatively, the controller 100 may output a warning sound of the error from the speaker or display information indicating the error on the display.

Fifth Embodiment

In addition to the configuration of the above embodiment, the role of each device may be performed by another device, the role of one device may be shared by a plurality of devices, or the role of a plurality of devices may be performed by one device. For example, as shown in FIG. 3, a part or all of the role or processing of the controller 100 described above may be executed by the arm controller 310 of the first arm 300 and the arm controller 410 of the second arm 400. Conversely, part or all of the role or processing of the arm controller 310 of the first arm 300 and the arm controller 410 of the second arm 400 may be carried by the controller 100.

Alternatively, the role of the controller 100, the arm controller 310 of the first arm 300, or the arm controller 410 of the second arm 400 may be realized by a server or the like on the cloud which can communicate with the controller 100 and various devices via the Internet or the like.

Sixth Embodiment

In the above embodiment, the camera 440 is attached to the second arm 400. However, the camera 440 may be attached to a third arm separate from the grip 430.

Alternatively, the camera 440 may be attached to the first arm 300 having the key 330.

Alternatively, the camera 440 may not move. That is, the camera 440 may be fixed to a support member mounted on the table 50.

Overview

In the above embodiment, there is provided a bill handling system including a camera, a grasping unit, and a control unit for photographing the inside of the cash box by the camera after a bill in the cash box is taken out by the grasping unit, determining whether or not a bill remains in the cash box based on the photographed image, and performing error processing when the bill remains in the cash box.

Preferably, as the error processing, the control unit determines whether or not the bill remaining in the cash box can be taken out by the grasping unit based on the photographed image. When it is determined that the bill remaining in the cash box can be taken out by the grasping unit, the control unit retries the processing of taking out the bill from the cash box. When it is determined that the bill remaining in the cash box cannot be taken out by the grasping unit, the control unit outputs an error notification.

Preferably, as the error processing, the control unit determines whether or not the bill remaining in the cash box can be automatically taken out by the grasping unit or another device based on the photographed image. When it is determined that the bill remaining in the cash box can be automatically taken out by the grasping unit or another device, the control unit executes a process of automatically taking out the bill remaining in the cash box by the grasping unit or another device. When it is determined that the bill remaining in the cash box can not be automatically taken out by the grasping unit or another device, the control unit outputs an error notification.

Preferably, the control unit utilizes machine-learning models trained by Artificial Intelligence to determine whether the bills remaining in the cash boxes can be taken out.

Preferably, as the error processing, the control unit interrupts the processing of taking out the bill from the cash box and outputs an error notification.

Preferably, the bill handling system further includes an acquiring unit for acquiring identification information for identifying each of cash box or each type of cash box. When the bill remains in the cash box, the control unit accumulates information indicating that the bill remains in the cash box in association with the identification information.

Preferably, the bill handling system further includes an acquiring unit for acquiring identification information for identifying each type of the cash box or each of the cash boxes. The control unit determines whether or not the bill remains in the cash box by using the identification information based on the photographed image.

Preferably, when the bill in the cash box is taken out by the grasping unit, the control unit photographs the inside of the cash box by the camera, determines the degree of wrinkling or damage of the bill in the cash box based on the photographed image, and determines the withdrawal speed of the bill.

Preferably, the control unit utilizes the machine learning model trained by the AI to determine whether the bill remains in the cash box.

Preferably, while the bill in the cash box is being taken out by the grasping unit, the control unit photographs the inside of the cash box by the camera and determines whether the bill is being taken out normally based on the photographed image. When the bill is not normally taken out, the control unit performs the bill taking out process again.

Preferably, the control unit uses the machine learning model trained by the AI to determine whether or not the bill is been taken out normally.

The embodiments disclosed herein are to be considered in all aspects only as illustrative and not restrictive. The scope of the present invention is to be determined by the scope of the appended claims, not by the foregoing descriptions, and the invention is intended to cover all modifications falling within the equivalent meaning and scope of the claims set forth below.

REFERENCE SIGNS LIST

1: Bill handling system
2: Bill removal system
10: Cash box
11: Lid door
12: Keyhole
12: Key
50: Table
100: Controller
110: CPU
120: Memory
121: Keyhole specification data
122: Thickness and state identification data
123: Take-out judgment data
124: Remaining judgment data
125: Error data
160: Communication Interface
200: Transporter
201: First conveyor
202: Second conveyor
210: Reverser
220: RFID antennas
230: Transfer unit
300: First arm
310: Arm controller
330: Key
400: Second arm
410: Arm controller
430: Grasping unit
440: Camera
500: Bill aligner
600: Bill sorter
700: Third arm
730: Grasping unit
800: Strapper
900: Storage box
B: Bill

The invention claimed is:

1. A bill handling system, comprising:
a camera;
a grasping unit; and
a control unit for:
photographing inside of a cash box by the camera after bills are taken out by the grasping unit;
determining whether one or more bills remain in the cash box based on a photographed image; and
performing error processing when one or more bills remain in the cash box, the error processing comprising pushing the one or more bills to a back of the cash box using the grasping unit to grasp the one or more bills remaining in the cash box, and then ungrasping the one or more bills remaining in the cash box and pushing the one or more bills remaining in the cash box into the back of the cash box using a tip of the grasping unit and then using the grasping unit to re-grasp and remove the one or more bills remaining in the cash box.

2. The bill handling system according to claim 1, wherein the control
- unit, as error processing, determines whether the one or more bills remaining in the cash box can be taken out by the grasping unit based on the photographed image; and
- performs again the processing of taking out the one or more bills from the cash box when it is determined that the one or more bills remaining in the cash box can be taken out by the grasping unit and outputs an error notification when it is determined that the one or more bills remaining in the cash box cannot be taken out by the grasping unit.

3. The bill handling system according to claim 2, wherein the control unit utilizes machine-learned models trained by artificial intelligence to determine whether the one or more bills remaining in the cash box can be taken out.

4. The bill handling system according to claim 1, wherein the control
- unit, as error processing, determines whether the one or more bills remaining in the cash box can be automatically taken out by the grasping unit or other device based on the photographed image; and
- executes a process of automatically taking out the one or more bills remaining in the cash box by the grasping unit or other device when it is determined that the one or more bills remaining in the cash box can be automatically taken out by the grasping unit or other device and outputs an error notification when it is determined that the one or more bills remaining in the cash box cannot be automatically taken out by the grasping unit or other device.

5. The bill handling system according to claim 1, wherein the control unit, as error processing, interrupts the processing of taking out bills from the cash box and outputs an error notification.

6. The bill handling system according to claim 1, further comprising:
- an acquiring unit for acquiring identification information of the cash box, wherein, when the one or more bills remain in the cash box, the control unit accumulates information indicating that the one or more bills remain in the cash box in association with the identification information.

7. The bill handling system according to claim 1, further comprising:
- an acquiring unit for acquiring identification information of the cash box, wherein the control unit determines whether the one or more bills remain in the cash box by using the identification information based on the photographed image.

8. The bill handling system according to claim 1, wherein when the one or more bills in the cash box is taken out by the grasping unit, the control unit photographs the inside of the cash box by the camera, determines the degree of wrinkling or damage of the one or more bill in the cash box based on the photographed image, and determines the withdrawal speed of the one or more bills.

9. The bill handling system according to claim 1, wherein the control unit utilizes a machine learning model trained by artificial intelligence to determine whether the one or more bills remain in the cash box.

10. The bill handling system according to claim 1, wherein, while the one or more bills in the cash box are being taken out by the grasping unit, the control unit photographs the inside of the cash box by the camera, determines whether or not the one or more bills are being taken out normally based on the photographed image, and performs again the bill taking out process when the one or more bills are not being taken out normally.

11. The bill handling system according to claim 10, wherein the control unit utilizes a machine learning model trained by artificial intelligence to determine whether the one or more bills are being taken out normally.

12. A bill handling system, comprising:
- a camera;
- a grasping unit;
- a control unit for:
- photographing inside of a cash box by the camera after bills are taken out by the grasping unit;
- determining whether one or more bills remain in the cash box based on a photographed image; and
- performing error processing when one or more bills remain in the cash box, the error processing comprising pushing the one or more bills to a back of the cash box using the grasping unit to grasp the one or more bills remaining in the cash box, and then ungrasping the one or more bills remaining in the cash box and pushing the one or more bills remaining in the cash box into the back of the cash box using a tip of the grasping unit and then using the grasping unit to re-grasp and remove the one or more bills remaining in the cash box; and
- an acquiring unit for acquiring identification information of the cash box.

13. The bill handling system according to claim 12, wherein the control
- unit, as error processing, determines whether the one or more bills remaining in the cash box can be taken out by the grasping unit based on the photographed image; and
- performs again the processing of taking out the one or more bills from the cash box when it is determined that the one or more bills remaining in the cash box can be taken out by the grasping unit and outputs an error notification when it is determined that the one or more bills remaining in the cash box cannot be taken out by the grasping unit.

14. The bill handling system according to claim 13, wherein the control unit utilizes machine-learned models trained by artificial intelligence to determine whether or not the one or more bills remaining in the cash box can be taken out.

15. The bill handling system according to claim 12, wherein the control
- unit, as error processing, determines whether the one or more bills remaining in the cash box can be automatically taken out by the grasping unit or other device based on the photographed image; and
- executes a process of automatically taking out the one or more bills remaining in the cash box by the grasping unit or other device when it is determined that the one or more bills remaining in the cash box can be automatically taken out by the grasping unit or other device and outputs an error notification when it is determined that the one or more bills remaining in the cash box cannot be automatically taken out by the grasping unit or other device.

16. The bill handling system according to claim 12, wherein the control unit, as error processing, interrupts the processing of taking out bills from the cash box and outputs an error notification.

17. The bill handling system according to claim 12, wherein, when the one or more bills remain in the cash box, the control unit accumulates information indicating that the one or more bills remain in the cash box in association with the identification information.

18. The bill handling system according to claim 12, wherein, the control unit determines whether the one or more bills remain in the cash box by using the identification information based on the photographed image.

19. The bill handling system according to claim 12, wherein when the one or more bills in the cash box are taken out by the grasping unit, the control unit photographs the inside of the cash box by the camera, determines the degree of wrinkling or damage of the one or more bills in the cash box based on the photographed image, and determines the withdrawal speed of the one or more bills.

20. The bill handling system according to claim 12, wherein, while the one or more bills in the cash box are being taken out by the grasping unit, the control unit photographs the inside of the cash box by the camera, determines whether or not the one or more bills are being taken out normally based on the photographed image in the middle, and performs again the bill taking out process when the one or more bills are not being taken out normally.

\* \* \* \* \*